United States Patent [19]

Taya

[11] 3,794,722

[45] Feb. 26, 1974

[54] IRON COMPOSITION FOR TREATING ANEMIA

[76] Inventor: Miguel Margarit Taya, Manuel Girona 56, Barcelona, Spain

[22] Filed: May 6, 1971

[21] Appl. No.: 140,995

Related U.S. Application Data

[63] Continuation-in-part of Ser. No. 855,762, Sept. 5, 1969, abandoned.

[30] Foreign Application Priority Data

Nov. 20, 1968 Spain .................................. 360433

[52] U.S. Cl. ................................ 424/147, 424/180
[51] Int. Cl. ............................................. A61k 27/00
[58] Field of Search ..................... 424/147, 180, 176

[56] References Cited
UNITED STATES PATENTS 3,252,863   5/1966   Lindvall et al. ..................... 424/176

3,592,889   7/1971   Lindvall et al. ..................... 424/147

*Primary Examiner*—Sam Rosen
*Attorney, Agent, or Firm*—Sughrue, Rothwell, Mion, Zinn & Macpeak

[57]  ABSTRACT

A method for treating hypoferric anemia in sucking mammals, said method comprising administering orally to a sucking mammal afflicted with hypoferric anemia a trivalent iron compound prepared by forming ferric oxide from soluble ferric iron salts by reaction with a member selected from the group consisting of $Na_2CO_3$, $K_2CO_3$, $(NH_4)_2CO_3$, NaOH, KOH and $NH_4OH$, preparing a mixture of this ferric oxide with at least one saccharide and a hexitol, neutralizing said mixture to a pH of between 6 and 9 by the addition of a hydroxycarboxylic acid, and concentrating the solution thus obtained to an iron concentration of about 80–150 mg/cc, and composition for achieving same.

14 Claims, No Drawings

3,794,722

IRON COMPOSITION FOR TREATING ANEMIA

CROSS-REFERENCES TO RELATED APPLICATIONS

The present application is a continuation-in-part of U. S. application Ser. No. 855,762, filed Sept. 5, 1969, now abandoned.

BACKGROUND OF THE INVENTION

1. Field of the Invention

This invention relates to a process for the manufacture of a trivalent iron compound suitable for oral administration with a view to obtaining acceptable assimilable iron when administered by The above-mentioned way for veterinary purposes, suitable for combatting hypoferric anemias.

2. Description of the Prior Art

The chemical literature contains a description of the preparation of ferric oxide complexes with polysaccharides in an alkaline medium; the polysaccharides mainly comprising a mixture of saccharose and glucose and later neutralized to a suitable pH of about 7.

In view of their stability and harmlessness, this combination is used for intravenous administration in anemic patients, the iron concentration being about 2 to 5 percent. When attempting to achieve higher concentrations for animal therapy, the viscosity of the preparation is increased extraordinarily, thus preventing success. Also, when attempting to concentrate, the metallic taste of these complexes renders them unpleasant for oral administration.

The above-mentioned techniques are based on the preparation of ferric oxide from soluble ferric salts, such as chloride, sulfate, citrate, etc., by reaction with sodium carbonate, whereby the precipitate obtained may be washed sufficiently to remove the acid ion.

The ferric oxide obtained in the presence of a concentrated solution of saccharose and glucose, when heated in an alkaline medium, solubilizes to form a collodial solution, which already has a suitable pH or which has to be adjusted with an organic or mineral acid. Subsequent concentration gives the desired iron content required; that is, around 2 to 5 percent as has been indicated.

The presence of glucose partially converts the ferric ion into ferrous ion and causes it to be included in the micelle of the colloidal ferric ion. Accordingly, the product acquires a dark color and, what is more important, a typical metallic taste. Because of its high viscosity, it is not possible to obtain iron concentrations of around 80–15 mg Fe/cc, which are really suitable for oral administration, and more preferably 100 mg/cc.

SUMMARY OF THE INVENTION

It is, therefore, the main goal of the present invention to provide a process for obtaining a trivalent iron compound suitable for oral administration and easily assimilable by the digestive system of the animals to which it is to be administered without producing disorders or lesions of any type in the organs of said digestive system.

The administration of a product orally to animals offers notable advantages over the intramuscular or intravenous route, provided that its absorption by the digestive system is assured and that it is completely harmless to the system. The possibility of oral administration, mixed in with the food or drink supplied to animals under treatment, avoids the need for employing specialized personnel and the difficulties inherent with parenteral administration.

Another object of the present invention is to provide a product obtained by said process which will be readily absorbed in the intestines, at least in the same amount as other known ferrous products are absorbed.

Still another object of the present invention is to obtain by way of the aforementioned process a product concentration of around 80–150 mg Fe/cc, and most preferably 100 mg/cc, which has no metallic taste and is free from unpleasant taste when administered orally.

Accordingly, the process of the present invention resides in the preparation of ferric oxide complexes with at least one saccharide by partially or wholly substituting the glucose with a hexitol, such as sorbitol and mannitol, whereby the reducing power of the sugar mixture is extremely lowered, thus maintaining the ferric ion in such a state as to prevent the formation of ferrous ions. In an alternative embodiment, fructose may be substituted for the glucose employed.

In this manner, concentrations of around 80–150 mg Fe/cc and preferably 100 mg/cc may be obtained with a viscosity of 6 to 10 centipoises at 25° C. In addition, the pH may be adjusted between 6 and 9 and still maintain product stability. This is accomplished by the addition of a hydroxycarboxylic acid, such as citric acid. This product lacks any metallic taste and is perfectly tolerated gastrically. However, in view of its concentration, it is not suitable for parenteral administration.

The product obtained in this manner may be readily dried, whereby a dry residue of about 500 to 570 grams per liter of solution can be obtained.

The resulting product may be easily administered to animals suffering from hypoferric anemia, at doses prescribed by the veterinarian, bearing in mind that the solution concentration should be around 80–150 mg Fe/cc. This will be further discussed later in this application. The product so formed finds special use in sucking mammals and sucking pigs.

Although sodium carbonate is the carbonate of choice to react with the iron salt, satisfactory results may be attained by employing other carbonates as well, such as potassium and ammonium. In addition, excellent results have been achieved when sodium, potassium or ammonium hydroxide is employed in place of the carbonate.

A better understanding of the present invention will be attained from the following examples, which are merely intended to be illustrative and not limitative of the present invention.

EXAMPLE I

A suspension of ferric oxide (equivalent to 500 grams of iron) is prepared from ferric chloride at a concentration of 200 mg of iron/cc with sodium carbonate. The suspension is washed until the chlorine ion is completely eliminated. Once this stage is reached, with a volume of about 20 liters, it is placed in a kettle with 1,300 grams of saccharose, 250 grams of 70 percent sorbitol and 50 grams of glucose.

A solution of 100 grams of NaOH in about 400 cc of $H_2O$ is added with stirring to the above mixture. The mixture is heated to reflux whereby a red liquid is obtained, which is concentrated down to 10 liters. Then a solution of 150 grams of citric acid in 250 cc of water is added to the mixture. Finally the mixture is concentrated under vacuum to 5 liters, whereby a red liquid with a viscosity of 8 centipoises at 25° C and a pH of 6.5 is obtained, without any metallic taste. This may be conveniently administered orally in perfect condition for assimilation.

EXAMPLE II

To a freshly prepared suspension of ferric oxide (equivalent to 500 grams of iron) is added 1.2 kg of saccharose and 500 grams of 70 percent sorbitol together with 125 cc of a solution of 70 percent sodium hydroxide. The mixture is refluxed with stirring and is concentrated, whereby a dark red solution is obtained, which is allowed to cool. Then 150 grams of citric acid in solution is added and the mixture is concentrated to 5 liters. A preservative is added and finally it is filtered.

The product obtained is a colloidal dispersion of ferric hydroxide, anodic in an electrolytic solution.

This product exhibits a viscosity of between 6 and 9 centipoises (referred to water at 25° C), a dry residue of between 0.500 and 0.570 gr/cc, pH between 6.5 and 9, and has no free ferrous or ferric ions.

The following tests described below have been performed to test the safety of the products obtained on the gastric mucosa of animals that have ingested them:

Test:

Five experimental batches were arranged, each comprising eight adult rats with an average weight of 200 grams each. They were administered a dose of 500 mg Fe/kg body weight, with the maximum volume of liquid administered being 2 cc/100 gr body weight.

In all cases the Fe compound was administered orally by way of an esophagic probe. Previously, the weight of each rat was checked so as to determine the dose.

The above-mentioned batches were differentiated by the iron compounds administered to each, as shown below:

The first batch of eight rats was administered ferrous gluconate.
The second batch of eight rats was administered ferrous sulfate.
The third batch of eight rats was administered ammoniacal iron citrate.
The fourth batch of eight rats was administered polysaccharide iron complex.
The fifth batch of eight rats was not given any product.
The last batch of experimental animals was arranged as a control for comparison of the results obtained in the other batches.

Four hours after administration of the above-mentioned products, the rats were sacrificed with an excess of anesthetic ether. They were examined and the stomach was removed along with the first section of the duodenum to the continuous opening along the greater curvature.

The results obtained are as follows:
First batch: Clear inflammation and irritation from the limits of the pre-stomach and all along the greater curvature of the stomach.
Second batch: Congested surfaces all over the gastric mucosa with bleeding ulcerous areas.
Third batch: Congested areas with hemorrhages, especially on the greater curvature; in the most affected cases, the congested area covered one-third of the gland surface.
Fourth batch: No congestion was to be observed in the gastric mucosa.
Fifth batch (control batch): Normal pink color, free from congestion.

As is observed from the results obtained, the ferrous gluconate, the ferrous sulfate and the ammoniacal ferrous citrate caused lesions in the gastric mucosa, while the poly-saccharide iron complex according to the present invention failed to exhibit any signs of gastric irritation.

Likewise, experiments have been performed with this product to test the intestinal absorption of the polysaccharide Fe, in comparison with other iron salts, for example, iron gluconate, the absorption efficiency of which is well known.

The experimental method consisted of having an amount of iron ingested and observing the sideraemia variations which occurred over several hours afterwards. Thus, it is shown that, in principle, the greater the sideraemia, the greater the absorption. Accordingly, when the sideraemia is high, the absorption drops, since the transferrin (which is the plasma protein enabling iron transportation) has reached a state of saturation.

In addition, tests have been performed on large groups of sucking pigs, since hypoferric anemia is frequent in these animals. The iron absorption was studied with the administration of ferrous gluconate to a batch of 22 sucking pigs and the polysaccharide complex to a second batch also comprising 22 animals. The dose administered was 75 mg of iron per animal.

Sideraemic analyses were performed before administration of the preparation, 3 hours and 8 hours after administration, with the necessary amount of blood being removed from each animal.

The sideraemic results obtained were as follows:

With ferrous gluconate:

| Time | Mg Fe/100 cc plasma |
| --- | --- |
| 0 hr. | 57.2 ± 20.5 |
| 3 hrs. | 712.0 ± 33.4 |
| 8 hrs | 462.0 ± 74.6 |

With the polysaccharide iron complex:

| Time | Mg/ Fe/100 cc plasma |
| --- | --- |
| 0 hr. | 51.0 ± 20.8 |
| 3 hrs. | 610.0 ± 50.6 |
| 8 hrs. | 480.0 ± 49.7 |

The above results demonstrate that the intestinal absorption of the polysaccharide iron complex according to the present invention offers values close to those given by ferrous gluconate, the ferrous salt of choice to date, which maintains the highest absorption values.

Having established the essential characteristics of the product obtained by the process of the present invention, it is readily apparent that said product can be easily administered to sucking mammals without risk of intestinal disorders and with complete assurance of excellent assimilation.

Insofar as the effective dosage rates of the product produced by the present invention is concerned, suitable results have been demonstrated when sucking mammals are administered a first dose of 1 cc 5 days following birth and subsequently administered a dose of 2 cc at 20 to 25 days after birth. However, it is readily apparent to any skilled veterinarian, that dosage rates among animals varies. Accordingly, the dosage limitations indicated herein can be widely varied according to body weight and severity of the hypoferric anemia.

Regarding the means of dosage administration, extremely high success has been encountered when oral administration is carried out by means of an aerosol dispersion. Aerosol devices capable of administering an allotted dosage of medicament are well known within the medical art. One of these aerosol dispensing devices (sometimes called "dosimeters") is the Magnimeter, which is produced by the Messrs. IDEV of France.

These dosimeters comprise a receptacle made from any suitable material, such as glass or aluminum. In addition to the receptacle, there is placed within the receptacle means to produce the aerosol. Finally, the receptacle is filled with a suitable amount of an inert carrier serving as a propellant and medicament in order that numerous doses may be dispensed. Particularly, excellent aerosol doses of high stability have been produced by employing nitrogen gas or butane gas as the propellant. Upon engaging the aerosol valve, a differential in pressure between the receptacle pressure and the atmospheric pressure causes atomization or the aerosol mist to form. While great success has been achieved with a nitrogen and butane propellant, applicant does not wish to limit his invention to these alone. That is, any pharmaceutically acceptable inert carrier capable of dispensing (in aerosol form) at least a 1 cc dose is acceptable, providing, however, stability of the product is not impaired. As indicated above, excellent stability has been achieved with nitrogen and butane.

In administering the dose of medication to a sucking animal, the aerosol device containing the medicament of the present invention is held in close proximity to the base of the mammal's tongue and subsequently the aerosol device is engaged, thus releasing a unit dose of medication orally to the animal.

As has been indicated, excellent oral administration has been attained through the use of aerosol devices, such as proposed herein. However, applicant does not limit himself to this particular mode of oral administration but realizes that any oral means of administration can be applied to the present invention, provided, however, that the goals of the present invention are not inhibited. For instance, the product produced by the process of the present invention can easily be administered to a sucking mammal in the form of a solution administered with a suitable eyedropper or other suitable device capable of administering the solution.

Although the present invention has been adequately described in the foregoing specification and examples included therein, it is readily apparent that various changes and modifications may be made without departing from the scope thereof.

What I claim is:

1. A pharmaceutical composition for oral administration useful in the treatment of hypoferric anemia in sucking mammals, said composition comprising, in combination, a pharmaceutically acceptable inert carrier and a trivalent iron compound prepared by:
   1. forming ferric oxide, equivalent to 500 grams of iron, from soluble ferric iron salts by reaction with a basic material selected from the group consisting of sodium carbonate, potassium carbonate, ammonium carbonate, sodium hydroxide, potassium hydroxide and ammonium hydroxide,
   2. heating to reflux temperature, a mixture of the ferric oxide obtained in (1) with from 1,200 to 1,300 grams of saccharose, 50 grams of a member selected from the group consisting of glucose and fructose, and 250 grams of a 70 percent hexitol solution, or optionally,
   heating to reflux temperature, a mixture of the ferric oxide obtained in (1) with from 1,200 to 1,300 grams of saccharose and 500 grams of a 70 percent hexitol solution,
   said hexitol being a member selected from the group consisting of sorbitol and mannitol,
   3. neutralizing said mixture to a pH of between 6 and 9 by the addition of citric acid, and
   4. concentrating the solution obtained to an iron concentration of from about 80 to 150 mg/cc.

2. The pharmaceutical composition of claim 1, wherein the ferric oxide is obtained from soluble ferric iron salts, selected from the group consisting of chloride, sulfate and citrate, by reaction with a member selected from the group consisting of $Na_2CO_3$, $K_2CO_3$, $(NH_4)_2CO_3$, $NaOH$, $KOH$ and $NH_4OH$ and washing the precipitate obtained until the acid ion is completely removed.

3. The pharmaceutical composition of claim 1, wherein said composition is in aerosol form and wherein the inert carrier is a member selected from the group consisting of nitrogen and butane.

4. The pharmaceutical composition of claim 3, wherein the inert carrier is nitrogen.

5. The pharmaceutical composition of claim 3, wherein the inert carrier is butane.

6. The pharmaceutical composition of claim 1, wherein the concentration of iron is about 100 mg/cc.

7. A method for treating hypoferric anemia in sucking mammals, said method comprising administering orally to a sucking mammal afflicted with hypoferric anemia, an effective amount of a trivalent iron compound prepared by:
   1. forming ferric oxide, equivalent to 500 grams of iron, from soluble ferric iron salts by reaction with a basic material selected from the group consisting of sodium carbonate, potassium carbonate, ammonium carbonate, sodium hydroxide, potassium hydroxide and ammonium hydroxide,
   2. heating to reflux temperature, a mixture of the ferric oxide obtained in (1) with from 1,200 to 1,300 grams of saccharose, 50 grams of a member selected from the group consisting of glucose and fructose, and 250 grams of a 70 percent hexitol solution, or optionally,
   heating to reflux temperature, a mixture of the ferric oxide obtained in (1) with from 1,200 to 1,300 grams of saccharose and 500 grams of a 70 percent hexitol solution,
   said hexitol being a member selected from the group consisting of sorbitol and mannitol, 3. neutralizing said mixture to a pH of between 6 and 9 by the addition of citric acid, and
4. concentrating the solution obtained to an iron concentration of from about 80 to 150 mg/cc.

8. The method of claim 7, wherein the trivalent iron compound is administered in two doses, the first being administered in an amount of 1 cc 5 days after birth, and the second dose being administered in an amount of 2 cc, 20 to 25 days after birth.

9. The method of claim 7, wherein the ferric oxide is obtained from soluble ferric iron salts, selected from the group consisting of chloride, sulfate and citrate, by reaction with a member selected from the group consisting of $Na_2CO_3$, $K_2CO_3$, $(NH_4)_2CO_3$, $NaOH$, $KOH$ and $NH_4OH$, and washing the precipitate obtained until the acid ion is completely removed.

10. The method of claim 7, further comprising, in combination with said trivalent iron compound, a pharmaceutically acceptable inert carrier.

11. The method of claim 7, wherein the final iron concentration is about 100 mg/cc.

12. The method of claim 10, wherein said trivalent iron compound and said pharmaceutically acceptable inert carrier are contained in aerosol form, said inert carrier being a member selected from the group consisting of nitrogen and butane.

13. The method of claim 12, wherein the pharmaceutically acceptable inert carrier is nitrogen.

14. The method of claim 12, wherein the pharmaceutically acceptable inert carrier is butane.

* * * * *